United States Patent [19]

Maehara

[11] 4,322,114

[45] Mar. 30, 1982

[54] HYDRAULIC PRESSURE CONTROL DEVICE FOR DOUBLE HYDRAULIC PIPING FOR VEHICLE BRAKES

[75] Inventor: Toshifumi Maehara, Hanazono, Japan

[73] Assignee: Akebono Brake Industry Co., Ltd., Tokyo, Japan

[21] Appl. No.: 109,116

[22] Filed: Jan. 2, 1980

[30] Foreign Application Priority Data

Jan. 12, 1979 [JP] Japan .................................. 54-2813
Apr. 17, 1979 [JP] Japan .................................. 54-46838

[51] Int. Cl.³ .............................................. B60T 8/26
[52] U.S. Cl. .................................. 303/6 C; 303/84 A
[58] Field of Search ............... 188/349; 303/6 C, 6 R, 303/22 R, 61, 84 A, 84 R

[56] References Cited

U.S. PATENT DOCUMENTS 3,627,385 12/1971 Stokes .................................. 303/6 C
3,752,535 8/1973 Wallace ............................... 303/6 C
4,071,281 1/1978 Nogami .......................... 303/6 C X

*Primary Examiner*—Duane A. Reger
*Attorney, Agent, or Firm*—Toren, McGeady & Stanger

[57] ABSTRACT

An improvement of a hydraulic pressure control device for a double piping type hydraulic system for vehicle brakes not only performs braking pressure control over both of two independent hydraulic pressure channels but also is capable of transmitting the same degree of hydraulic pressure to the rear wheels of a vehicle as the front wheels thereof by releasing one hydraulic pressure channel from a control action when the other hydraulic pressure channel becomes defective, so that insufficiency in the braking force on the whole vehicle resulting from such a defect can be effectively compensated.

9 Claims, 7 Drawing Figures

HYDRAULIC PRESSURE CONTROL DEVICE FOR DOUBLE HYDRAULIC PIPING FOR VEHICLE BRAKES

BACKGROUND OF THE INVENTION

1. Field of the Invention

This invention relates to an improvement of a hydraulic pressure control device for double piping used in a hydraulic system for vehicle brakes.

2. Description of the Prior Art

It is well known that, in order to prevent wheels of a vehicle from coming into a locked state, a braking force to be applied to the rear wheels must be less than a braking force to be applied to the front wheels. To meet this requirement, there has been provided a hydraulic pressure control device capable of appropriately allocating braking hydraulic pressure to the front and rear wheels, with the hydraulic pressure being approximately proportional to the braking force to be applied to these wheels. Since the brake to be applied to a vehicle is extremely important in the safety arrangement required for the vehicle in general, the hydraulic pressure control device must have high reliability. In view of this, there has been provided a braking hydraulic system of a double piping type comprising two independent hydraulic pressure channels to ensure that a certain degree of a braking force can be secured even if one of the two channels becomes defective. Further, there has been also provided a double piping hydraulic pressure control device which is capable of performing brake oil pressure control over such a hydraulic system to have both the two independent channels thereof controlled thereby in common with each other.

SUMMARY OF THE INVENTION

It is a general object of this invention to provide an improvement on the above stated double piping hydraulic pressure control device which is arranged not only to perform braking hyraulic pressure control over the two independent hydraulic pressure channels in common but also to transmit equal degrees of hydraulic pressure to the rear wheels and the front wheels by releasing one hydraulic channel from a control action when the other hydraulic pressure channel becomes defective, so that the insufficiency in the braking force on the whole vehicle resulting from such a defect can be effectively compensated.

The above and further objects, features and advantages of the invention will become apparent from the following detailed description of embodiments thereof taken in connection with the accompanying drawings.

DETAILED DESCRIPTION OF PREFERRED EMBODIMENTS

Figure 1:
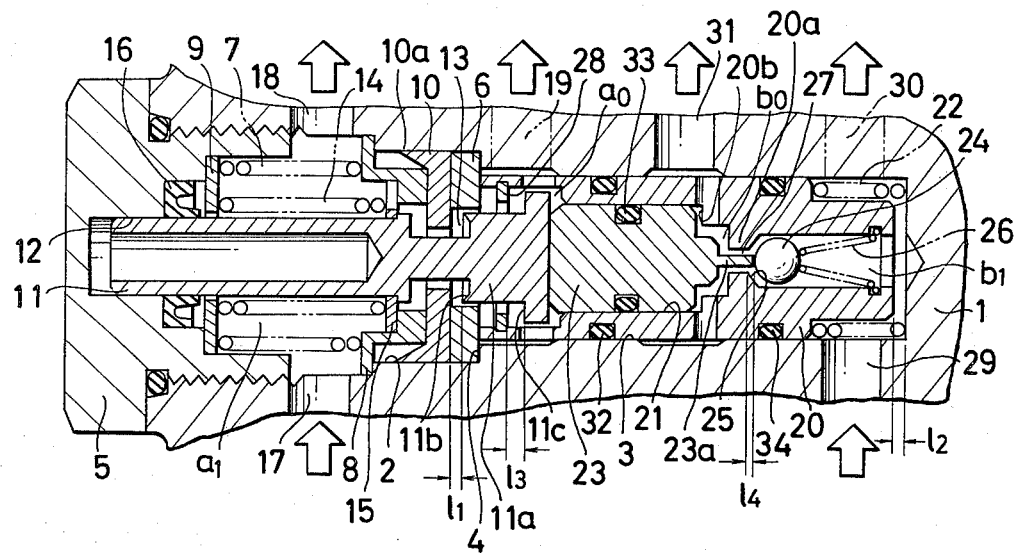
FIG. 1 is a longitudinal sectional view showing a hydraulic pressure control device for double piping as embodiment of the present invention.

In FIG. 1 which shows an embodiment of the double piping hydraulic pressure control device of the present invention, a reference numeral 1 indicates a valve body. A first cylinder 2 and a second cylinder 3 which are formed in a stepped manner are closed by a plug 5 which is attached to the first cylinder 2. Between the first and second cylinders 2 and 3, there is formed a stepped shoulder part 4.

A ring-shaped back-up piece 6 is caused to engage with the stepped shoulder part 4 by the force of a spring 7 which has one end thereof engaged with the plug 5. Both ends of the spring 7 are arranged to engage spring seats 8 and 9. A valve seat 10 is interposed in between the spring seat 8 and the back-up piece 6. The outer peripheral lip portion 10a of the valve seat 10 is arranged to be in sliding contact with the first cylinder 2 and, with the valve body part 11b of a control piston 11, which will be described below, arranged to abut on the side face of the valve seat 10, a first valve part is formed to open and close a flow passage 13. The above stated control piston 11 has its smaller diameter part at one end thereof arranged to be in slidable engagement with a third cylinder 12 which is formed in the plug 5 and has a smaller diameter than that of the second cylinder 3. The larger diameter head portion 11a of the control piston 11 is formed at the other end thereof and is disposed at an opening provided in a fail-safe piston 20, which is in slidable engagement with the inside of the second cylinder 3 penetrating through the valve seat 10 and the back-up ring 6. A valve body part 11b is formed at the larger diameter head portion 11a of the control piston 11. There is provided a control spring 14 which is arranged to push the control piston 11 in such a way as to disengage the valve body part 11b of the control piston 11 from the valve seat 10. One end of the control spring 14 is arranged to engage a spring seat 15, which normally pushes the control piston 11 to bias it into a position in which it engages the spring seat 8 of the spring 7. A reference numeral 16 indicates a cup seal.

The structural arrangement described in the foregoing constitutes a hydraulic pressure control valve part in one of two braking hydraulic pressure channels which are independent of each other. An input oil chamber $a_i$ which has the shaft portion of the control piston 11 disposed therein and an output oil chamber $a_0$ which has the larger diameter head portion 11a of the control piston 11 disposed therein are arranged such that, normally, the flow passage 13 is open with the control piston 11 being biased by the force of the control spring 14 to a predetermined position and, when hydraulic pressure is in action, the control piston 11 moves against the force of the control spring 14 to cause the valve body part 11b to abut on the valve seat 10 to close the flow passage. After that, output hydraulic pressure $P_{oa}$ is raised while having it lower than input hydraulic pressure $P_{ia}$ in the ratio of the sectional area $A_1$ of the larger diameter head portion 11a of the control piston 11 to the sectional area $A_2$ of the third cylinder 12 as expressed by: $\tan\theta = (A_1 - A_2)/A_1 < 1$.

There is provided a first input port 17 which allows the input oil chamber $a_1$ to communicate with a tandem master cylinder which is not shown but is serving as a hydraulic pressure source to generate hydraulic pressure for the two independent hydraulic pressure channels. Also provided is an output port 18 which connects the input oil chamber $a_1$ to a first front wheel brake device (not shown). In addition to these ports, there is provided a first output port 19 which allows the output oil chamber $a_0$ to communicate with a first rear wheel brake device which is not shown.

A valve part which controls the hydraulic pressure of one of the two hydraulic pressure channels in response to the operation of a hydraulic valve part of the other hydraulic pressure channel is formed by the following structural arrangement: A cylindrical fail-safe piston 20 in which a fourth cylinder 21 is formed is arranged to be in slidable engagement with the second cylinder 3. The second cylinder 3 is pushed and biased by a relatively small spring force of a spring 22, which engages one end of the second cylinder 3 and has a smaller force than the spring 7, in such a way as to have the other end thereof engaged with the above stated back-up ring 6. There is provided a balance piston 23 which slidably engages with the inside of the fourth cylinder 21. The inside of the fourth cylinder 21 is thus divided by the balance piston 23 into the above stated output oil chamber $a_0$ of one of the two hydraulic pressure channels and an output oil chamber $b_0$ of the other hydraulic pressure channel. The balance piston 23 is arranged to move within the fourth cylinder to balance the two output oil chambers $a_0$ and $b_0$ with each other. A protrudent locking rod part 23a of this balance piston 23 protrudes into an input oil chamber $b_1$ by penetrating through a flow passage 27 formed in the middle part of a partition wall portion 20a of the fail-safe piston which forms the input oil chamber $b_1$ separately from the output oil chamber $b_0$. This protrudent locking rod portion 23a constitutes a valve part in conjunction with a ball 24, a valve seat 25 and a spring 26 which is arranged to push the ball 24 toward the valve seat 25. This valve part operates in association with the hydraulic pressure control part of the above stated one of the hydraulic pressure channels to serve as hydraulic pressure control valve part for controlling the hydaulic pressure in the other hydraulic pressure channel. Normally, the ball 24 engages the locking rod part 23a of the balance piston 23 and the balance piston 23 engages the control piston 11 which is biased to a reposed position. The flow passage 27 which allows the input and output oil chambers $b_1$ and $b_0$ to communicate with each other is thus normally open. When the control piston 11 is caused by the action of hydraulic pressure to retreat relative to the fail-safe piston 20, or to the left as viewed on the drawing, the force of the spring 26 causes the balance piston 23 to follow the control piston. Then, the flow passage 27 is closed as the ball 24 comes to abut on the valve seat 25. After that, the balance piston 23 repeats moving in both axial directions thereof to balance the pressure in the output oil chamber $a_0$ with the pressure in the other output oil chamber $b_0$. With the movement of the balance piston 23 repeated in this manner, output hydraulic pressure $P_{oa}$ and output hydraulic pressure $P_{ob}$ of the two hydraulic pressure channels are raised in a relation of $P_{oa} = P_{ob}$.

Within an opening which forms one of the output oil chamber $a_0$ of the fail-safe piston 20, there is provided a stopper 28 which engages the stepped part 11c of the larger diameter head portion 11a of the control piston 11 to define the extent of the relative movement of the fail-safe piston 20 and the control piston 11. Since the flow passage 13 must be allowed to open and close under a normal condition and then must be prevented from being closed when the other hydraulic pressure channel, or the channel b, becomes defective, this relative movement of the fail-safe piston 20 and the control piston 11 is arranged in such a manner: Assuming that the extent of the stroke of the control piston 11 from its reposed position to a position in which it engages with the valve seat 10 is $l_1$, the extent of the stroke of the fail-safe piston 20 within the second cylinder 3 until it comes to abut on the wall face of the cylinder (the face of the right end wall as viewed on the drawing) is $l_2$ and the defined maximum extent of the above stated relative movement is $l_3$, the following relation must obtain there:

$$l_1 < l_3 < l_1 + l_2$$

This input oil chamber $b_1$ is arranged to communicate, through a second input port 29, with a master cylinder provided for the second hydraulic pressure channel and to communicate through an output port 30 with a second front wheel brake device. The output oil chamber $b_0$ is arranged to communicate with a second rear wheel brake device through a second output port 31. Reference numerals 32, 33 and 34 respectively indicate pressure seal members.

Figure 2:
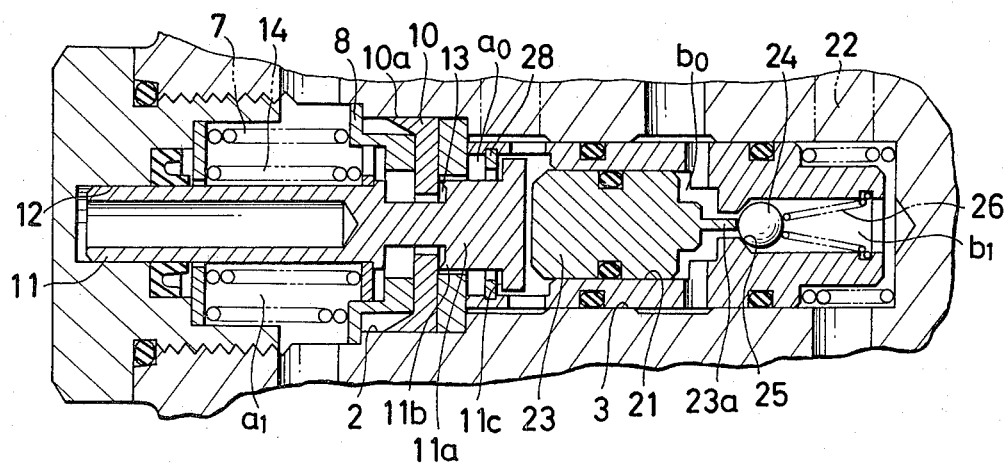
FIG. 2 is a longitudinal sectional view showing the same hydraulic pressure control device as in a normal operating state.
Figure 3:
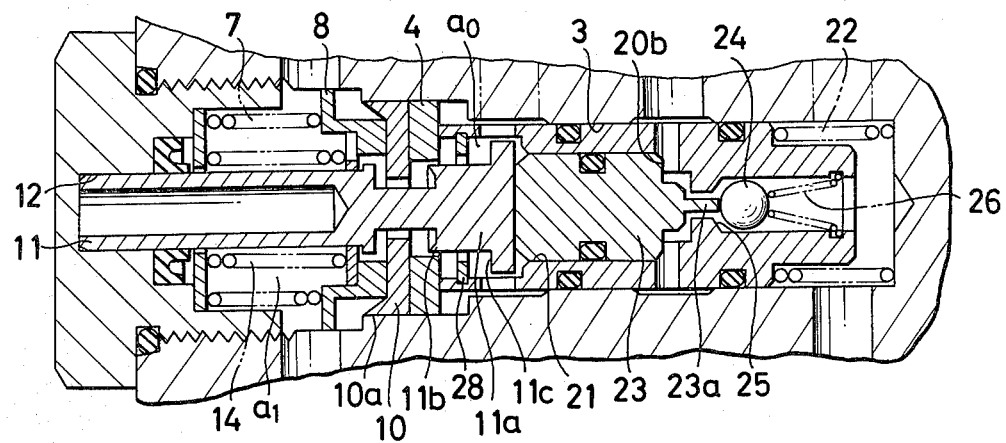
FIGS. 3 and 4 are also longitudinal sectional views showing the same hydraulic pressure control device as in operating states when one of the two hydraulic pressure channels is defective.
Figure 4:
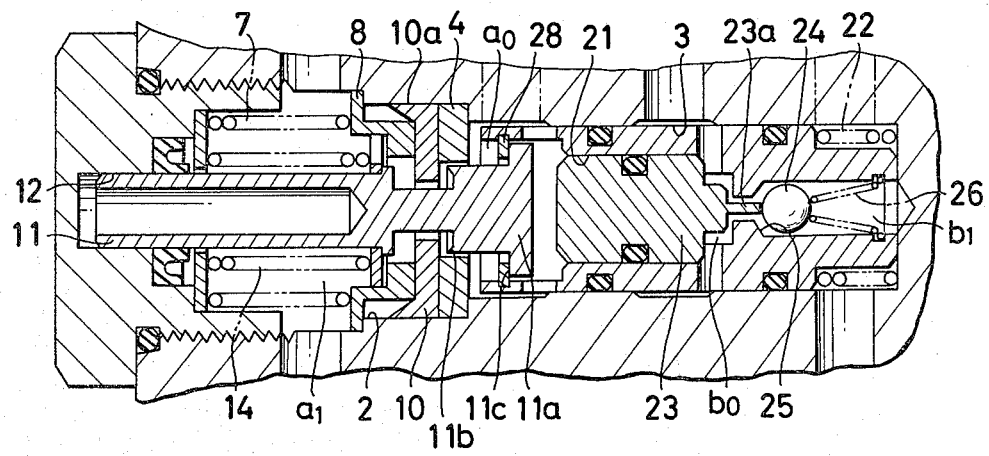

Referring to FIG. 2, FIG. 3 and FIG. 4, the double piping hydraulic pressure control device which is arranged as described in the foregoing operates in the following manner: FIG. 2 shows the device as having the two independent hydraulic pressure channels in a normal operative condition. When braking hydraulic pressure is transmitted from a master cylinder to the hydraulic control device which has not been brought into an operating condition as shown in FIG. 1, in the initial stage of the transmission of the hydraulic pressure, the rear wheel brake hydraulic pressures $P_{oa}$ and $P_{ob}$ of the two channels increase equally to input hydraulic pressures $P_{ia}$ and $P_{ib}$ of the two channels as the input and outpout of oil chambers $a_1$, $a_0$, and $b_0$ of the two channels a and b are communicating with each other through the flow passages 13 and 27 respectively. Then, according as the braking hydraulic pressure increases, the control piston 11 is caused by the hydraulic pressure to move to the left, as viewed on the drawing, against the force F of the control spring 14 as mentioned in the foregoing. The valve body part 11b of the control piston 11 comes to abut on the valve seat 10 to close the flow passage 13. The braking hydraulic pressure at this point of time can be expressed by:

$$P_{ia} = P_{oa} = (F/A_2)$$

After that, compared with the input hydraulic pressure $P_{ia}$, the output hydraulic pressure $P_{oa}$ shows a low rising gradient as represented by:

$$\tan\theta = (A_1 - A_2)/A_1 < 1$$

Figure 5:
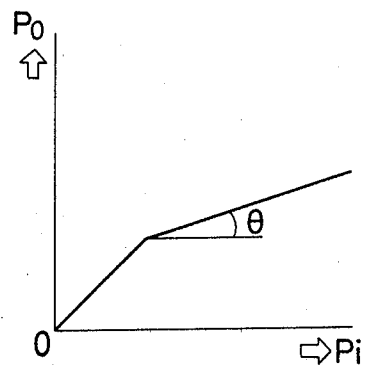
FIG. 5 is a graph showing a braking hydraulic pressure rising characteristic curve in a normal operating condition.

In association with the above mentioned hydraulic pressure control over the channel a, the hydraulic pressure control over the other channel b is performed in the following manner: With the extent of the stroke $l_4$ required for the ball 24 to close the flow passage 27 by coming to abut on the valve seat 25 being preset to be $l_1 > l_4$ as compared with the extent of the stroke $l_1$ required for the control action by the control piston 11, during the hydraulic pressure control over the channel a as shown in FIG. 2, the balance piston 23 within the fourth cylinder moves away from the control piston 11 and works to open and close the flow passage 27 in such a way as to balance the output hydraulic pressures $P_{oa}$ and $P_{ob}$ with each other (with the spring force of the spring 26 being arranged to be very small and negligible). Accordingly, the input and output hydraulic pressures $P_{ib}$ and $P_{ob}$ are in a relation to those of the other channel a as represented by $P_{ia} = P_{ib}$ and $P_{oa} = P_{ob}$. FIG. 5 shows this relation.

When one of the two independent hydraulic pressure channels becomes defective, the other channel is released from the hydraulic pressure control action.

When the channel a becomes defective (FIG. 3):

In this instance, no hydraulic pressure is transmitted to the input and output oil chambers of the channel a. Therefore, the hydraulic pressure of the other channel b causes the fail-safe piston 20 and the balance piston 23 to move to the left as viewed on the drawing. Then, the smaller diameter end of the control piston 11 comes to abut on the bottom part of the third cylinder 12 and the balance piston 23 is stopped by the control piston 11 while the fail-safe piston 20 also comes to a stop with its stepped part 20b coming to engage the balance piston 23 and there obtains a positional relation as shown in FIG. 3. This relation remains unchanged even if the braking hydraulic pressure in the channel b continues to increase thereafter and the input and output oil chambers $b_1$ and $b_0$ thus continuously communicate with each other. In other words, the ball 24 is kept disengaged from the valve seat 25.

When the Channel b becomes Defective (FIG. 4)

No hydraulic pressure is transmitted to the input and output oil chambers $b_1$ and $b_0$. The fail-safe piston 20, therefore, comes into contact with the side wall of the cylinder on the right hand side, as viewed on the drawing, a against the force of the spring 22. Then, when the input and output hydraulic pressures $P_{ia}$ and $P_{oa}$ of the channel a increases, the hydraulic pressure causes the control piston 11 to move to the left as viewed on the drawing. However, as mentioned in the foregoing, the extent of the retreating stroke of the control piston 11 relative to the fail-safe piston 20 is restricted by the stopper 28 and the extent $l_1$ of the stroke of the control piston 11 required for abutting on the valve seat 10, the extent $l_2$ of the moving stroke of the fail-safe piston 20 to the right as viewed on FIG. 4 and the extent $l_3$ of the retreating stroke of the control piston 11 relative to the fail-safe piston 20 are in a relation of $l_1 < l_3 < l_1 + l_2$. Further the sectional area $A_3$ of the cylinder 3 is larger than the sectional area $A_2$ of the third cylinder 12. Under the condition as shown in FIG. 4, therefore, the valve body part 11b of the control piston 11 does not come into contact with the valve seat 10. Therefore, there takes place no hydraulic pressure control action over the channel a. Accordingly, the flow passage 13 remains open and the input and output oil chambers $a_1$ and $a_0$ are kept communicating with each other.

Figure 6:
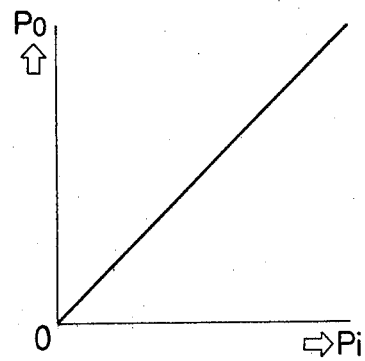
FIG. 6 is a graph showing a braking hydraulic pressure rising curve obtained when one of the hydraulic pressure channels is defective.

In other words, when either one of the two hydraulic pressure channel is defective, the other hydraulic pressure channel has its input hydraulic pressure $P_i$ and its output hydraulic pressure $P_o$ in a relation of $P_i = P_o$ as shown in FIG. 6.

Figure 7:
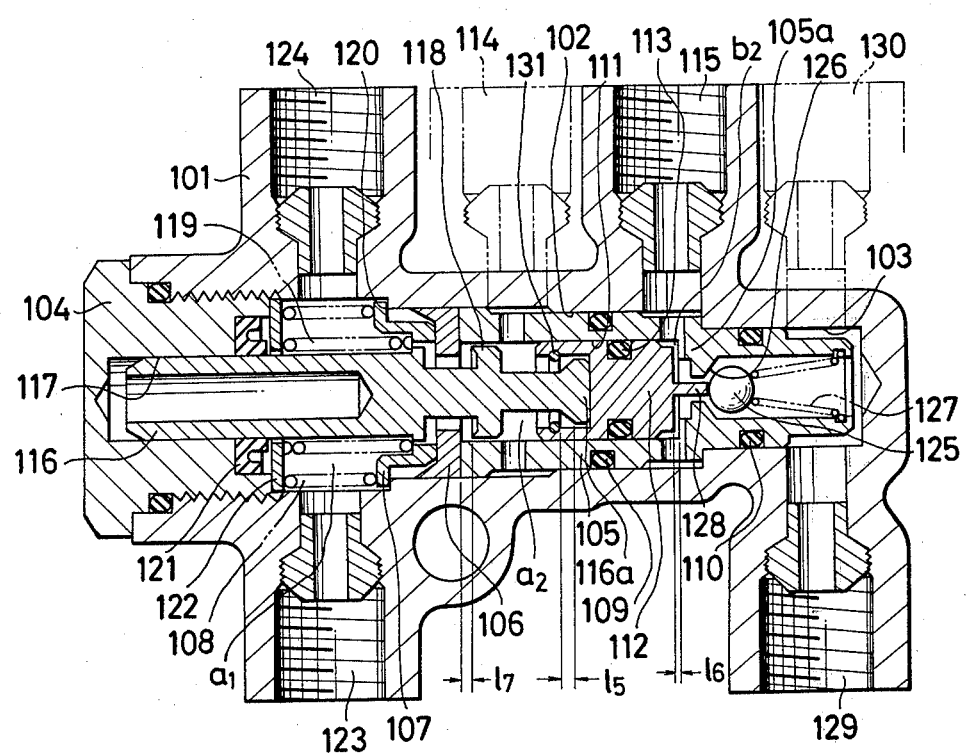
FIG. 7 is a longitudinal sectional view showing another embodiment of the invention.

Another embodiment of the present invention is as shown in FIG. 7, in which: A reference numeral 101 indicates a valve body; 102 and 103 indicate a stepped valve cylinder which consists of a larger diameter part 102 and a smaller diameter part 103. The valve cylinder is closed by a plug 104 while a stepped cylindrical fail-safe piston 105 is arranged to be in slidable engagement with the valve cylinder. The larger diameter end face of the fail-safe piston 105 engages with a valve seat 106. The fail-safe piston 105 is pushed by a spring 108 toward the smaller diameter side thereof through the valve seat 106 and a spring seat 107 and is in response with its stepped shoulder part engaged with the stepped part of the valve cylinder. There is provided seals 109 and 110 which are arranged to seal the sliding faces of the fail-safe piston 105 and the larger and smaller diameter parts 102 and 103 of the valve cylinder. A balance piston 112 is arranged to slidably engage with the inner cylinder 111 of the fail-safe piston 105. A seal 113 which seals the sliding face of the balance piston 112 serves to isolate liquid chambers with both end faces of the balance piston 112 arranged to face them. These liquid chambers serve as independent output liquid chambers $a_2$ and $b_2$ and are arranged to communicate respectively through first and second output ports 114 and 115 with first and second rear wheel brake devices provided for different wheels.

A reference numeral 116 indicates a control piston which, in conjunction with the above stated valve seat 106, constitutes a first valve mechanism in one hydraulic pressure channel a. One end of the control piston 116 is arranged to slidably engage with a blind hole cylinder 117 formed in the above stated plug 104 while an enlarged head part 116a which is formed at the other end thereof penetrates through an opening provided in the middle of the valve seat 106 and is disposed within the inner cylinder 111 of the fail-safe piston 105, the enlarged head part 116a of the control piston 116 being thus placed inside of a recess provided in one end of the above stated balance piston 112. The control piston 116 is provided with a valve body part 118 which is arranged to close a communicating passage by abutting on the side end face of the output liquid chamber $a_2$ of the valve seat 106. There is provided a control spring 119 which is arranged to push the control piston 116 toward the output liquid chamber $a_2$ (to the right as viewed on the drawing). One end of the control spring 119 engages a circumferential protrusion formed on the control piston 116 and also engages the above stated spring seat 107 which is engaging with the spring 108. With the spring seat 107 arranged to engage the stepped part 120 of the valve cylinder to restrict movement to the right as viewed on the drawing, the control piston 116 is arranged to be normally kept at rest in the position as shown in the drawing.

There is provided a seal cup 121 which is arranged to provide a liquid seal for the sliding faces of the control piston 116 and the blind hole cylinder. An annular stopper lip 131 is attached to the inner circumference of the recessed part of the balance piston 112. Then, with the fore end part of the control piston 116 being thus prevented from pulling out of the recessed part of the balance piston 112, the extent to which the control piston 116 and the balance piston 112 are movable in their axial direction relative to each other is restricted to a predetermined distance $l_5$. This predetermined distance $l_5$ is set in such a manner that: When the balance piston 112 is in repose as shown in the drawing, the distance $l_5$ in relation to the distance of gap $l_6$ between the balance piston 112 and the stepped part 105a of the inner cylinder 111 and also in relation to the distance of gap $l_7$ between the valve body part 118 of the control piston 116 and the side end face of the valve seat 106 satisfies a relation of $(l_7+l_6)>l_5>l_7$.

The shaft portion of the control piston 116 is disposed in an input liquid chamber $a_1$, which normally communicates with an output liquid chamber $a_2$ in a condition as shown in the drawing. When hydraulic pressure moves the control piston 116 to have the valve body part 118 abut on the valve seat 106, the communication between the input and output liquid chambers is blocked thereby. After that, the first valve mechanism works to control output hydraulic pressure $Pa_2$ in relation to input hydraulic pressure $Pa_1$ in the same manner as in the preceding example of embodiment by the balance of hydraulic pressure exerted on the control piston 116. The input liquid chamber $a_1$ is arranged to communicate with the first hydraulic pressure channel of a tandem master cylinder through a first input port 123 and also to communicate with a first front wheel brake device through an output port 124.

There is provided a ball 125 which in conjunction with a valve seat 126 of the fail-safe piston 105 constitutes a second valve mechanism in the hydraulic pressure channel b. The ball 125 is pushed by a valve spring 127 and is arranged to be normally kept away from the above stated valve seat 126 by a locking rod 128 which extends from the balance piston 112 to penetrate through a hole provided in the middle of the fail-safe piston 105 and thus to protrude into the input liquid chamber $b_1$. With the second valve mechanism arranged in this manner, input and output liquid chambers $b_1$ and $b_2$ normally communicate with each other. When hydraulic pressure control makes the hydraulic pressure $Pa_2$ of the output liquid chamber $a_2$ lower than the output hydraulic pressure $Pb_2$ (which is equal to input hydraulic pressure $Pb_1$), the balance piston 112 moves to the left (toward the channel a) as viewed on the drawing. The leftward movement of the balance piston 112 causes the ball 125 to abut on the valve seat 126 to cut off the communication between the input and output liquid chambers $b_1$ and $b_2$. After that, the slight movement of the balance piston 112 in the axial direction, which takes place in response to an increase in the hydraulic pressure $Pa_2$ of the output liquid chamber $a_2$, causes the second valve mechanism to open and close to control the output hydraulic pressure $Pb_2$ in relation to the input hydraulic pressure $Pb_1$. Accordingly, the output hydraulic pressures $Pa_2$ and $Pb_2$ of both hydraulic pressure channels a and b gradually increase in relation to the input hydraulic pressures $Pa_1$ and $Pb_1$ while they are kept balanced with each other by the balance piston 112 to have the same degree of pressure. The input liquid chamber $b_1$ is connected to the second hydraulic pressure channel of the tandem master cylinder through a second input port 129 and to a second front wheel brake device through an output port 130.

With the double piping hydraulic pressure control device arranged as described in the foregoing, hydraulic pressure control over the two channels is normally performed in the same manner as in the preceding example of embodiment. The output hydraulic pressures $Pa_2$ and $Pb_2$ are controlled and lowered from the input hydraulic pressures $Pa_1$ and $Pb_1$ to have braking forces suitably allocated to the front and rear wheels.

When either one of the two hydraulic pressure channels a and b becomes defective and unserviceable, the serviceable channel is released from the hydraulic pressure control. A feature of this invention lies in the manner in which the channel is released from the hydraulic pressure control as will be understood from the following description:

When the Channel a becomes Defective:

Hydraulic pressure from the channel b moves the balance piston 112 to the left as viewed on the drawing to push the control piston 116. Further, the fail-safe piston 105 is also moved by the hydraulic pressure of the channel b to the left as viewed on the drawing. The movement of these pistons is resisted only by the spring force of the spring 108 and that of the control spring 119. The latter spring force is larger than the former spring force. Besides, the hydraulic pressure required for moving the balance piston 112 is greater than the pressure required for moving the fail-safe piston 105 because of difference in their pressure receiving areas. Therefore, the fail-safe piston 105 is first moved to the left by the hydraulic pressure of the channel b to leave no gap between the balance piston 112 and the fail-safe piston 105 and thus the distance of gap $l_6$ between them becomes zero. Then, these pistons move together to the left until the rear end of the control piston 116 comes to abut on the bottom of the blind cylinder 117 and the pistons come to a stop.

Throughout the whole range of the operation of the second valve mechanism, therefore, the communication between the input and output liquid chambers $b_1$ and $b_2$ remains unblocked and the input and output hydraulic pressures $Pb_1$ and $Pb_2$ increase while they are kept at equal levels of pressure.

When the Channel b becomes Defective:

Hydraulic pressure moves and biases the fail-safe piston 105 to the right. While the control piston 116 is operated by hydraulic pressure in the same manner as under a normal condition, the hydraulic pressure of the channel a causes the balance piston 112 to move to the right as viewed on the drawing until it comes to abut on the stepped part 105a of the fail-safe piston 105 without leaving the gap $l_6$ there. Therefore, the opening and closing control over the communication passage between the input and output liquid chambers $a_1$ and $a_2$ of the first valve mechanism is removed.

Let us assume that the extent of movement of the control piston 116 caused by the action of hydraulic pressure, against the force of the control spring 118, to the left as viewed on the drawing until it comes to abut on the valve seat 107 is $l_7$. However, since the balance piston 112 is abutting on the stepped part 105a of the fail-safe piston 105, the extent of rightward movement of the control piston 116 is restricted to $(l_5-l_6)$ with a stopper ring 131 abutting on the head portion 116a of the control piston 116 and there obtains a relation of $(l_5-l_6)<l_7$. Besides, the sectional area of the blind hole cylinder 117 is smaller than that of the balance piston 112 and, therefore, the control piston 116 is unable to abut on the valve seat 106. Accordingly, the communication between the input and output liquid chambers $a_1$ and $a_2$ remains unblocked throughout the whole range of the operation. The input and output hydraulic pressures $Pa_1$ and $Pa_2$ are thus arranged to increase and are kept at equal levels of pressure.

As described in the foregoing, the hydraulic pressure control device for double piping of the present invention not only ensures suitably allocated distribution of front and rear wheel braking hydraulic pressure during a normal braking operation but also is capable of compensating a loss in the braking force as a whole when one hydraulic pressure channel becomes defective by removing its hydraulic pressure control to lower rear wheel braking hydraulic pressure. The invented device, therefore, has a very great practical advantage.

What is claimed is:

1. A hydraulic pressure control device arranged to be connected with first and second hydraulic pressure channels for acting on a rear wheel brake device of a vehicle, comprising a valve body, a first valve mechanism within said valve body and including a control spring, a first valve seat and a control piston arranged to receive hydraulic pressure of the first hydraulic pressure channel and to move in response thereto against the force of said control spring to control and lower the output hydraulic pressure of the first hydraulic pressure channel by thus coming into contact with said first valve seat; a balance piston in said valve body, a first output chamber within said valve body at one end of said balance piston, a second output chamber within said valve body at the other end of said balance piston, said first output chamber arranged to receive the pressure of the first hydraulic pressure channel, said second output chamber arranged to receive the pressure of the second hydraulic pressure channel, said balance piston arranged to receive the pressure of the first and second output chambers of first and second hydraulic pressure channels at the opposite ends thereof; said valve body having an input port and an output port for connection to the second hydraulic pressure channel and a second valve mechanism in said valve body, which, in response to the movement of said balance piston toward said first output chamber, cuts off communication between the input port and output port of the second hydraulic pressure channel, wherein the improvement comprises that said valve body forms a cylinder, a cylindrical fail-safe piston arranged to slidably engage said cylinder within said valve body; said fail-safe piston being provided with a second valve seat; and a closing member connected to said balance piston and engageable with the second valve seat in response to the movement of said balance piston toward said first output chamber.

2. A hydraulic pressure control device according to claim 1, wherein said valve body has an input chamber arranged to be connected to the second hydraulic pressure channel, one end of said fail-safe piston is arranged to receive the pressure of the first hydraulic pressure channel while the other end of said fail-safe piston is arranged to receive the pressure of said input chamber of said second hydraulic pressure channel.

3. A hydraulic pressure control device according to claim 2, further including a first spring in said valve body arranged to push said fail-safe piston toward said first output chamber; and a second spring in said valve body arranged to counteract the spring force of said first spring with a greater spring force than that of the first spring.

4. A hydraulic pressure control device according to claim 3, wherein a stopper means positioned at one end of said fail-safe piston and arranged to abut said control piston when the second hydraulic pressure channel is defective inhibiting said control piston from coming into contact with said first valve seat and thus preventing the pressure of the first output chamber from being lowered.

5. A hydraulic pressure control device according to claim 4, wherein, assuming that the extent of the stroke of said control piston required to contact said first valve seat is $l_1$, the extent of the stroke of said fail-safe piston required for abutment with the end face of said valve body is $l_2$ and the extent of the stroke of said control piston required for abutment with said stopper means is $l_3$ there obtains the following relation:

$$l_1 < l_3 < (l_1 + l_2).$$

6. A hydraulic pressure control device according to claim 2, wherein a restriction means is provided on said valve body, when the first hydraulic pressure channel is defective, the pressure of the second hydraulic pressure channel interlinks said control piston, said balance piston and said fail-safe piston with each other and causes them to move together until said control piston comes into contact with said restricting means on said valve body; and then said closing member is inhibited from contacting said second valve seat so that the pressure of said second output chamber is prevented from being lowered.

7. A hydralic pressure control device according to claim 2, wherein a stopper means is located at one end of said balance piston which is arranged to receive the pressure of said first output chamber, and, when said second hydraulic pressure channel is defective, said control piston is inhibited from coming into contact with said first valve seat with said control piston coming into contact with said stopper means, so that the pressure of said first output chamber is prevented from being lowered.

8. A hydraulic pressure control device according to claim 7, wherein said balance piston having a recessed part in said one end therein for housing one end of said control piston; and said stopper means is secured to said recessed part.

9. A hydraulic pressure control device according to claim 7, wherein assuming that the extent of the stroke of said control piston required for contacting said stopper means is $l_5$, the extent to which said balance piston is movable toward said second output chamber is $l_6$ and the extent of the stroke of said control piston required for its coming into contact with said first valve seat is $l_7$ there obtains the following relation:

$$(l_7 + l_6) > l_5 > l_7.$$

* * * * *